(12) United States Patent
Nye

(10) Patent No.: US 7,373,337 B2
(45) Date of Patent: *May 13, 2008

(54) METHOD AND APPARATUS FOR EVENT MODELING

(75) Inventor: Jeff Nye, Bellevue, WA (US)

(73) Assignee: Google Inc., Mountain View, CA (US)

(*) Notice: Subject to any disclaimer, the term of this patent is extended or adjusted under 35 U.S.C. 154(b) by 319 days.

This patent is subject to a terminal disclaimer.

(21) Appl. No.: 10/458,513

(22) Filed: Jun. 10, 2003

(65) Prior Publication Data

US 2003/0195867 A1    Oct. 16, 2003

Related U.S. Application Data

(63) Continuation of application No. 10/022,179, filed on Dec. 12, 2001, now Pat. No. 6,578,043, which is a continuation of application No. 09/170,026, filed on Oct. 12, 1998, now Pat. No. 6,341,279.

(51) Int. Cl.
  *G06F 17/30* (2006.01)
(52) U.S. Cl. .......................................... 707/3
(58) Field of Classification Search ............. 707/1–10, 707/100–104.1, 200–205
   See application file for complete search history.

(56) References Cited

U.S. PATENT DOCUMENTS

| | | | | |
|---|---|---|---|---|
| 5,644,764 A | * | 7/1997 | Johnson et al. | 707/103 R |
| 5,691,917 A | * | 11/1997 | Harrison | 717/127 |
| 5,809,235 A | * | 9/1998 | Sharma et al. | 709/230 |
| 5,905,890 A | * | 5/1999 | Seaman et al. | 717/122 |
| 6,023,572 A | * | 2/2000 | Lautzenheiser et al. | 703/2 |
| 6,065,009 A | * | 5/2000 | Leymann et al. | 707/10 |

OTHER PUBLICATIONS

Chan, L.C. et al., "Devising a Flexible Event Model on Top of a Common Data/Knowledge Storage Manager", Hong Kong University of Science and Technology, Department of Computer Science, Technical Report (HKUST-CS96-14), 1996.
Culik II, K. et al., "Computation Theoretic Aspects of Cellular Automata," Physica D 45, 1990, pp. 357-378.
Wolfram, S., "Universality and Complexity in Cellular Automata," Physica D 10, 1984, pp. 1-35.

* cited by examiner

*Primary Examiner*—Hosain Alam
*Assistant Examiner*—Navneet K Ahluwalia
(74) *Attorney, Agent, or Firm*—Fenwick & West LLP

(57) ABSTRACT

The present invention provides a method that allows a developer to add complex dependency logic to an existing database without having to modify the underlying structure of the database. One embodiment of the present invention provides a way to flexibly handle record state transitions by using an event model. The event model is a set of one or more items called an event. Each event in the event model has an associated event type and contains dependency logic that interrelates the events in the event model with one another. Each event represents a set of actions that are optionally contingent upon a condition. The actions and conditions that comprise an event are determine when the event is created. Each event may have a different set of actions and conditions. This enables an event to represent a number of different things. An event can represent anything it is defined to represent. In one embodiment of the present invention an event metamodel is instantiated to represent a number of different event models and the corresponding dependencies that interrelate them. The event metamodel enables the model creator to control what happens to each and every event in the event metamodel without having to modify the underlying structure of the database.

23 Claims, 8 Drawing Sheets

METHOD AND APPARATUS FOR EVENT MODELING

This is a continuation of application Ser. No. 10/022,179 filed Dec. 12, 2001, now U.S. Pat. No. 6,578,043; which is a continuation of application Ser. No. 09/170,026, filed Oct. 12, 1998, now U.S. Pat. No. 6,341,279.

BACKGROUND OF THE INVENTION

1. Field of the Invention

This invention relates to a method and apparatus for modeling events.

2. Background Art

A company that sells subscriptions to customers stores information about its customers in a database. The company would like to be able to remind a customer when the customer's subscription is about to end, and to give special offers to certain customers depending on who the customers are and how early or late the customers renew a subscription. Current database systems do not operate efficiently when the database becomes large. Current databases also lack the flexibility to be changed to allow the addition of new types of data to a customer database entry. Problems with existing database systems can be understood by first reviewing database systems.

When data is collected and stored on a computer in an organized manner that collection of data is called a database. In an effort to make the data stored in databases easily retrievable, databases are organized according to a predetermined structure. Unfortunately, once the underlying structure of the database is implemented the process of changing it is cumbersome. To add new relationships to a database the structure of the entire database must often be redefined. As a result, current database models inherently lack flexibility.

Database Organization

Databases are organized according to a data model that specifies the organizational structure of the database. A variety of different data models exist and each organizes data in a different manner. Examples of data models include the relational model, the object oriented model and the physical data model.

Once a data model is chosen the overall design of the database is implemented using that model. This overall design of the database is often referred to as the database schema and is defined by using a special language called a data definition language (DDL).

A database may contain one or more tables that are defined in a file called the data dictionary. Tables help keep the data in the database organized. FIG. 1 illustrates a table 100 that contains information about customers. Each table is designed to store a collection of data and is comprised of a number of rows 101-107. A row is separated into one or more columns 120-124 and each column is designated to receive values that have an associated name 140. When data is placed into the table 100 it is placed in the appropriate column 120-124. For example, values 130-135 represent a series of customer identification numbers. These values are placed in column 120. Once an entry in a column contains an item of data it is referred to as a record. Each table may hold numerous records. When a row 101-107 is filled with data it represents a unique set of records. For example, if data were placed in columns 120-124 of row 101 that data is representative of the customer that has the customer identification number 130.

A disadvantage of the way database tables are organized is that its organizational schema is predetermined and fixed. As a result current databases lack a flexible structure. For example, if a person using table 100 wanted to begin collecting other kinds of addressing information about a customer, such as the customers' work address or electronic mail address, a new column 206 to hold that information is required and must be defined. To define a new column a new table 200 that has an additional column 206 is created. Thus an inherent disadvantage of current database systems is that the user is locked into collecting the kind of information the table is pre-defined to hold. Table 100, for example, can only hold information pertaining to a customer's identification number, a customer's name, a customer's address, a customer's phone number, and a customer's fax number. To enter any other kind of information in Table 100 a new column must be defined.

Another disadvantage of current database systems is that every field in a table is assigned a value even if one does not exist. Referring now to Table 200 in FIG. 1, if data is entered into one of the columns in row 102 data must also entered into all the remaining columns. When no real information exists to input into a column, some other value, such as a NULL value, zero, or some other value. For example, if the value "Bob" is placed in the column 121 of row 102 and the value "14 Main St" is placed in column 122 of row 102 the remaining columns in row 102 are assigned NULL values. Since values are assigned to every row in column 120, the remaining values of each row are filled with NULL values. This occurs regardless of whether additional information is actually entered into Table 200. Once a row is filled with one piece of data the remaining entries for that row are filled with some value. Placing values inside a table even when one is not supplied wastes memory and computing resources.

Data that is stored in the records of a table can form the basis of a relationship between another table in the database as long as the other table has a related record. Data stored in a column (or columns) of a table can form the basis for a relationship between that table and another table in the database having a related column (or columns). For example, the customer table could be related to a table the customer orders table if the customer table contains a series of records having fields with the names "customer identification", "last name", "first name", "street address", "city", "zip code" and the customer orders table has fields with the names "customer identification", "service provided", and "date service rendered." Since both of these tables share a field with the name "customer identification", the tables are both related to the same customer. Using a relationship between columns of two tables, it is possible to join these two tables to provide a single table of information that contains instances of rows from one table combined with related rows from the other table.

Tables may be related via one-to-one, one-to-many, or many-to-one relationships. In a one-to-one relationship, one row in one table is related to a single row in a second table and vice versa. For example, a row in an employee table that contains information about an employee relates to a salaries table that contains the employee's salary information. Since an employee is typically only earning a single salary, there is a one-to-one relationship between an employee's employee table record and the employee's salary table record.

In a one-to-many relationship, a row in one table may be related to many rows in a second table, but each row in the second table matches only one row in the first table. For example, a state table that contains a state identifier and a state name can be related to multiple rows in the employee table. However, a row in the employees table identifies only one state of residence, for example. Conversely, a many-to-one relationship exists where many rows in one table match only one row in a second table, but each row in the second table may match many rows in the first table.

To relate two tables, it is necessary to identify one or more columns that are common to both tables. These columns are typically referred to as keys. A primary key is a unique key within a table and uniquely identifies a row within the table. A foreign key in a second table is comprised of the column (s) containing a first table's primary key information. For example, in the employee table, an employee identifier (employeeID) can be assigned to uniquely identify each employee. The employeeID can be used as a primary key for the employees table. The employeeID can also be used as a foreign key in the salaries table. The employees and salaries tables can be joined by the employeeID columns in each table to have information from both tables available in a single record.

Applications are developed to provide a user with the ability to facilitate access and manipulation of the data contained in a DBMS. A DBMS includes a Data Manipulation Language (DML) such as Structured Query Language (SQL). A DML provides set-oriented relational operations for manipulating data in the DBMS. However, a DML requires a precise syntax that must be used to access and manipulate DBMS data. To use a DML, a user must understand and use the DML's syntax. Instead of requiring each user that wishes to modify a DBMS' data to learn the DML's syntax, applications are written that provide an interface between the user and a DBMS' DML.

A database application typically includes a graphical user interface (GUI) that is comprised of presentation elements such as a form. A form is a self-contained presentation element with predefined areas for displaying, entering and/or changing data. The predefined areas are typically referred to as fields.

Fields in a form can be read-only (e.g., a label field). A form can also have fields in which information is displayed and the user can enter information. For example, in an operation to modify an employee's last name, a text field can be used to display the name currently stored in the database and allow the user to overwrite the display to enter the employee's new last name. When user submits the information, the application can retrieve the user input and update the database accordingly.

To populate the fields in a form, the application developer must associate fields in the database with fields in the form. This process is typically referred to as binding database fields with form fields. In a simple example of a form, the fields contained within the form are bound to fields in a single table.

A form can be more complicated where fields receive data from multiple tables. The application developer designing a form must be aware of the relationship(s) that exist between the tables that are to be bound to the fields in the form. If, for example, the form contains fields from tables that are related via a one-to-many relationship, the application developer must design the form the accommodate multiple rows of information. For example, a form that displays a department and its job listings (which are related via a one-to-many relationship) must be able to display the department information as well as multiple job listings for that department. The form must be designed to display the department and include multiple rows to display the job listings for the department, for example.

The relationship between the department and job listings tables is a one-to-many relationship. That is, there can be many job listings for a given department. The format of the display of information related by a one-to-many relationship is different than that used to display information related by either a many-to-one or one-to-one relationship.

For example, the employees, salaries and state tables are related to each other via many-to-one (e.g., more than one employee can reside in the same state) and one-to-one relationship (e.g., each employee has a salary). Since a row in the employees table is related to a single row in state and salaries tables, the developer can design a form with fields that display information about an employee taken from these three tables. For example, the form can contain fields to display the employee's name, state of residence and salary.

Thus, it can be seen that the design of a form depends on the type of relationships that exist between the tables. Using existing interface design tools, the application developer has been required to have knowledge of these relationships. The application developer must be aware of the structure of a database including the tables, the columns within a table and the relationships between tables. For example, an application developer that is building a form to display output retrieved from a database must associate fields in the form with columns in the database. If the form includes columns from multiple tables, the developer must be aware of the relationships that exist between the tables which includes the type of relationship.

Data Collection

One way to collect information and place it into a database is by using the Internet. The Internet is a worldwide network of interconnected computers. A user accesses the Internet by using an Internet client. An Internet client is a piece of computer software that communicates with the Internet via an Internet provider. An Internet provider is an organization that provides a client (e.g., an individual or other organization) with access to the Internet (via analog telephone line or Integrated Services Digital Network line, for example).

The World Wide Web (WWW) is a portion of the Internet that transfers information using HyperText Transfer Protocol (HTTP). HyperText Transfer Protocol (HTTP) is one of the standard protocols a client uses to communicate with a server on the WWW. Other protocols such as TCP/IP and FTP are also used. A server is the computer where information is stored before it is sent to the Internet client. Servers may store any kind of data. For example a server may store a database or a series of web pages. A web pages is a document that, for example, is programmed using HyperText Markup Language (HTML). HTML is one of the languages Internet clients understand.

A user can send information to the server by using an Internet client. The server can collect this information and add it to a database. This creates a database of user information. The database of user information is a collection of data about users. The information contained in the user database is typically information provided by the user, but it can also be obtained from other sources.

In one embodiment of the invention the user provides information to the server by completing an online form. For example, the user might want to receive a free subscription to an electronic newsletter. To receive the electronic newsletter the user provides the publisher of the newsletter with an electronic mail address, a street address, and credit card information. One way of providing this information is by using a web page that contains an online form. An online form is programmed in HTML by using the FORM element. HTML includes a FORM element that provides the ability to create a web page that has a fill-in form.

An HTML document containing a FORM element permits the user to enter information and send that information to the client. The user enters the information through the use of a limited number of FORM components: checkboxes; radio boxes; pull-down lists; text windows; and menus. The information entered through the FORM components is transmitted as a single unit to a gateway program on the server. In this manner the user can send information to the server. For example, the user can send the information necessary to subscribe to the electronic newsletter. Once the server receives the information provided by the user the server stores it in a database.

In one embodiment of the invention information is obtained from the user by collecting information provided by the HTTP protocol. When a user visits a web site HTTP passes information between the server and the internet client using environment variables. In this embodiment the information contained in these environment variables is collected and then stored on the server for later use. For example, the environment variables USER_NAME, DATE_GMT, and DOCUMENT_NAME all contain useful information about the user. The variable USER_NAME contains the name of the user as it is defined in the users internet client. The variable DATE_GMT specifies the date the user visits a web page and the variable DOCUMENT_NAME provide the name of the document a user is viewing. This information provided by the HTTP protocol is stored in a database and supplemented with information obtained from other sources.

SUMMARY OF THE INVENTION

The present invention provides a method that allows a developer to add complex dependency logic to an existing database without having to modify the underlying structure of the database.

The status of records in a database change over time. The status of a record is referred to as the "state" of the record. When the records status changes it is called a state transition. One embodiment of the present invention provides a way to flexibly handle state transitions by using an event model. The event model is a set of one or more items called an event. Each event in the event model has an associated event type and contains dependency logic that interrelates the events in the event model with one another.

An event provides a way to manipulate data that is not dependent upon the structure of the data it is manipulating. Each event represents a set of actions that are optionally contingent upon a condition. The actions and conditions that comprise an event are determine when the event is created. Each event may have a different set of actions and conditions. This enables an event to represent a number of different things. An event can represent anything it is defined to represent.

In one embodiment of the present invention an event metamodel is created. An event metamodel is a model of one or more event models. Thus, it is a model of a model. An event metamodel can be instantiated to represent a number of different event models and the corresponding dependencies that interrelate them. The event metamodel is used, for example, to describe a set of modeled events. This is accomplished by maintaining values that represent the type of events the event metamodel describes.

The event metamodel enables the model creator to control what happens to each and every event in the event metamodel without having to modify the underlying structure of the database. Instead of changing the structure of the database a new data type can be created in the event model. Once this new data type is created it can immediately be used. Thus, the event metamodel provides a way to add functionality to a database and immediately make that functionality available for use. All of this is done without having to create new tables or change the relationship that exists between tables.

DETAILED DESCRIPTION OF THE INVENTION

A method and apparatus for event modeling is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The claimed invention can be used to manipulate or add to the data contained in a database. The invention is used, for example, on relational databases, object-oriented databases, or other database environments. One embodiment of the invention is useful when an existing database needs new capabilities. The claimed invention allows the developer to add complex dependency logic to an existing database without having to modify the underlying structure of the database. This frees the developer from having to add columns or change the relationships established in the existing database. Instead the developer can utilize the present invention to define a new event. What an event comprises is discussed below. A new database can also be created to take advantage of the benefits provided by the present invention. The present invention provides a level of generality that makes it possible to flexibly expand a database environment.

State Transitions

The present invention can be used in a subscription service environment. A database is used to store records corresponding to customers that subscribe to some provide product or service. During the life of the subscription the status of a customer changes. Examples of the different status a customer may have over time may include status as a new customer, a customer who's subscription is about to expire, a customer who is targeted for a specific renewal offer, a newly renewed customer that has not yet paid the subscription fee, and others. Groups of customers may acquire a status based on the date that renewal or service is requested. A customer may also be part of a group that subscribed under a specific promotion or offer. The status of a customer or customer record is referred to as its "state" in the invention and may undergo one or more state transitions over time.

Record State

Over time the status of a record in the database changes. A record that was once the newest record is no longer the newest record when another record is entered. The status of a record is referred to as the records state. When a records status changes it is called a state transition. A state transition is a change in how two or more pieces of data interrelate. An action, such as removing a person from the subscriber list, can cause a state transition to occur. When a person cancels a subscription to a magazine, for example, that person is no longer a current subscriber of the magazine. Thus, the person's state transitions from that of a current subscriber to a previous subscriber.

Figure 8:
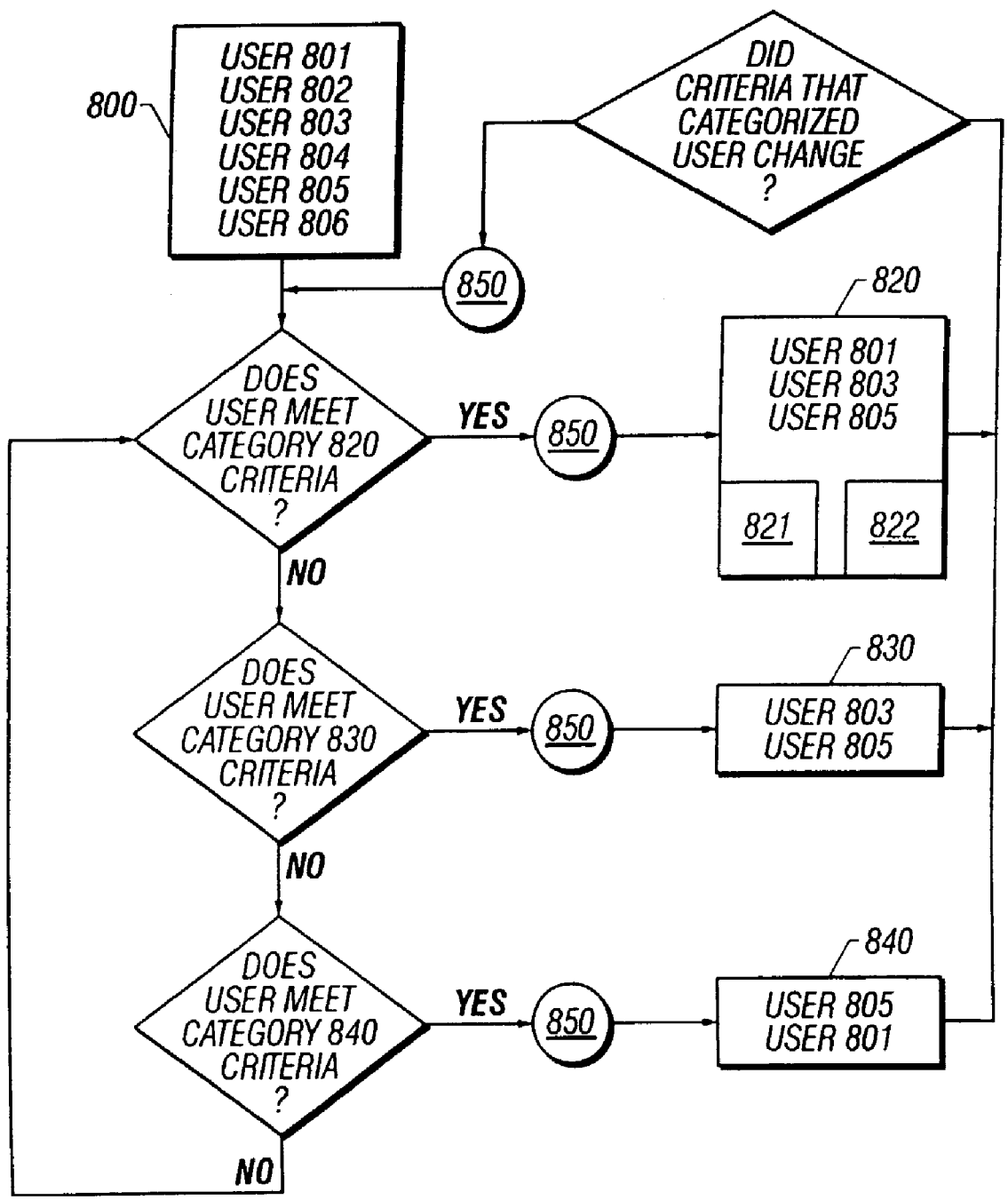
FIG. 8 illustrates how one embodiment of the invention categorizes the data contained in a database.

In one embodiment of the invention the data contained in a database is categorized according to its status. Referring now to FIG. 8 for example, a database of users 800 can be categorized according to the users 801-806 current status. If, for example, user 801, 803, and 805 sign up to receive a free 6 month subscription to an online newsletter these users belong to the free trial subscriptions category 820. If after 6 months passes users 803 and 805 choose to continue receiving the newsletter and begin paying for it, users 803 and 805 are placed in the paying subscribers category 830. If user 805 then decides to cancel the subscription, then user 805 is placed in the canceled subscriptions category 840. After 6 months pass the users that have not renewed their subscription are also placed in the canceled subscriptions category 840.

Each category may have subcategories. The paid subscriptions category 820, for example, could contain a subcategory 821 called "discount subscribers" and another subcategory 822 called "preferred subscribers."

Over time the status of the data that resides in one category transitions to another category. When data changes categories it is called a state transition 850. Data is assigned to a different category when the criteria that places it in a category changes. For example, the data held in the free trial subscribers category 820 is moved to the canceled subscriptions category 840 when a person lets their subscription run out or cancels it. When this happens another state transition 850 occurs.

Categorizing the database according to the status of the data held in it allows separate actions to be performed on each category. Placing users into separate categories, for example, allows separate actions to be performed for each group of users. A database administrator could decide, for example, to send an electronic mail message to the users who are in the paying subscribers category to thank them for subscribing or to offer additional services. Categorization allows actions to be directed specifically at a certain group of users based on criteria specified by the database administrator, for example.

Event MetaModel

In the invention, events in an event metamodel M are represented as nodes of a directed graph G. Each node, or event, has associated with it the following attributes:

An internal state,
Zero or more pieces of data specific to this particular event,
Zero or more pieces of data shared by all events of the event type as this, event,
A way to decide when to try to generate a new internal state, and
A way to generate a new internal state.

The event metamodel provides a framework in which multiple event models can be instantiated, and it contains a built-in clock mechanism which will drive an instantiated event model, turning it into an event processor.

A number of terms are used in describing the metamodel of the present invention.

An abstract serializable typed data object whose string representation is no longer than the length of the datatype longest_varchar is called a datum. A datum can be associated with event instances and with abstract type objects.

An abstract type, also called, relative to itself, a super-0-type or just type, is a label supplied by the model developer which supplies the external semantics for elements of M. A type is itself a typed object. The type of an abstract type is called a supertype, or super-1-type. Thus the set of all abstract types contains abstract types, super-types, super-super-types (written super-2-types), and so on, and can be written $U_{k \in \{0\} \cup \aleph} \text{super-k-type}$.

A datum shared by more than one event or type is called a type datum and is associated with an abstract type. A type datum is inherited unless overridden by subtypes, just as public data members are inherited in Java or C++. For example, let E be a set of distinct events which send email. Suppose that events $E1=\{e1, e2, \ldots, e\} \subset E$ use mailserver m1 and the remaining events $E2=E \backslash E1 \emptyset$ use mailserver m2 m1. And suppose there are other datums, such as where to log the fact that mail was sent, which are common to all events in E. To compactly represent E one can create a type T1 and a subtype T2 of T1, and then store the datums shared by all events as type datums of T1. Then for $i \in \{1, 2\}$, one can store mi as a type datum of Ti and associate each member of Ei with event type Ti. This will cause T2 to override the mailserver name of T1 with m2 while preserving access by members of E2 to other shared datums of T1.

A datum specific to a single event instance and not shared with another event or type is called an event datum. For example: suppose it is desired to email a form letter to user number 144332 at 10:00 PM tomorrow night. The following datums could be associated with an event which would actually send the email: userid 144332, fantasy team name, tomorrow's date, and the name of an email template letter.

An event dependency relationship exists between an event e2, called a dependent event, and an event e1, called a prerequisite event, if and only if there exists an edge of G which starts at e1 and ends at e2. In this case, event e1 is said to precede event e2, and event e2 is said to depend upon event e1.

The semantics of the word "depend" here are supplied by the trigger function associated with the abstract type of ej. The event dependency relationship forms a mesh on M. That is, an event can depend upon zero to many past events, and an event can be a past event of zero to many events.

An hierarchical type containment relationship, or htcr, associates a one or more abstract types with a exactly one metatype. The htcr represents the set of relationships between super-k-types and super-(k+1)-types for $k \in \{0\} \in_\aleph$ There can be more than one meaningful way to order a given set of abstract types in a type containment hierarchy. For this reason a new abstract type called CONTAINMENT TYPE is created and a type discriminator called containment type is associated with the ordering relation. The semantics of an htcr are provided by its containment type.

Consider, for example, an inventory application that tracks various items for manufacturing. One useful htcr, say of containment type a, might be Ha defined as

| bolts, fabric, fuel, otherthings | parts |
|---|---|
| | airplane |
| Bob, Sue, other people | labor |

Another useful htcr, say of containment type b a, might be Hb defined as

| Bob, Sue, rubber, fabric | nonhazardous materials |
|---|---|
| | airplane |
| fuel, cleaning chemicals | hazardous materials |

This implementation of type containment represents a compromise between the ease-of-use of a tree structure and the flexibility of a mesh.

An event instance, or event, is a set of actions, possibly empty, which is optionally contingent upon a condition. An event is associated with one abstract type te called the event type.

An event can depend upon zero or more events, and zero or more events can depend on it. And an event can optionally have a trigger function $t_e$, a state function $t_e$, or both.

The name of the stored procedure which implements $t_e$ for te is given by the TRIGGER FUNCTION datum associated with te. The name of the stored procedure which implements $t_e$. for te is given by the STATE FUNCTION datum associated with te. The model semantics of "depends" and "state" are given by $t_e$ and $t_e$ respectively.

$t_e$ takes as input the set of events upon which an event e depends and their respective states, and returns a value of one or zero indicating whether the event e has been "triggered" or "not triggered" respectively. It expresses a model's policy of when to continue processing events dependent upon the state of event and when not to. The case where $t_e$ is null is equivalent to te having no trigger function at all.

The state $t_e$ will be computed only if an event is triggered. $t_e$ returns an event_state se, based on the outcome of the ordered set of actions $t_e$ tries to perform. The case where $t_e$ is null is equivalent to t, having no state function at all.

The set S of possible event states is defined by the model developer and will vary according to the event sets being modeled. Consider, for example, if modeling set of events relating to a credit card authorization, then a useful set of states for these events might include the following states: "Authorization approved", "Authorization declined", "Hardware error—cannot retry", "Line is busy—retry later".

Let $_R$be the set of natural numbers,

|X|denote the number of elements in a finite set X,

E={e1,e2, ,ei, ,e$_{|E|}$} be the set of modeled events,

S={s1,s2, ,si, ,s$_{|S|}$} be the set of all possible event states,

T={t1,t2, ,ti, ,t$_{|T|}$} be the set of all abstract types,

D={d1,d2, ,di, ,d$_{|D|}$} be the set of all datums,

EDi=(ed1,ed2, ,edj, ,ed$_{|ED_i|}$)$\subseteq$D be the ordered set of all elements of event-specific data associated with event i, TDi=(td1,td2, ,tdj, ,td$_{|TD_i|}$)$\subseteq$D be the ordered set of all elements of type-specific data associated with abstract type I, $\Gamma(x, c)$ denote the supertype operator relative to containment type c, which for an abstract type t returns the unique supertype of x in the type hierarchy selected by c if such a supertype exists, and the empty set otherwise, $\Gamma^n(x, c)$ denote the nth repeated application of to x, relative to c, $\Delta(x)$ denote the dependency operator, which for an event x returns the set of events upon which x depends.

Subsets of G

The set of active events is the set of events whose state se is of a type which derives from either the abstract type Y et=YET To HAPPEN or the abstract type Happening=HAPPENING. The set Active can be written as Active={e$\in$E:$\exists$n$\in\epsilon_R$$\exists$t$_e\in$Tsuch.that$\Gamma^n$(t$_e$,State)$\in${Yet,Happening}} where State is equal to the containment type STATE and te is the type of event e.

An event which is not active is called inactive. The set of inactive events is just the set complement of Active relative to E, that is Inactive=E\Active.

An event upon which no event depends is called a leaf event. The set of leaf events can be written as Leaf={e$\in$E: e$\notin\cup_{i\in E}\Delta(i)$}.

An active leaf event is sail to be a computable event. The set of computable events can be written Computable=Active$\cap$Leaf.

Propagation of Event Logic

During each tick of the internal clock, all computable events are processed in random order. The following steps occur once per clock cycle, or tick, for each computable event e of event type te:

1. Define $z = \begin{cases} \tau_{t_e}(\Delta(e)) & \text{if } \tau_{t_e} \text{ exists} \\ 0 & \text{otherwise} \end{cases}$ 2. If $z = 0$ and $\varphi_{t_e}$ exists, then let $se = \varphi_{t_e}(e)$.

Thus complex application logic propagates in G at the rate of at most one complex operation, or node traversal, per tick. Multiple logic paths execute in parallel.

EXAMPLE EMBODIMENT

Figure 5:
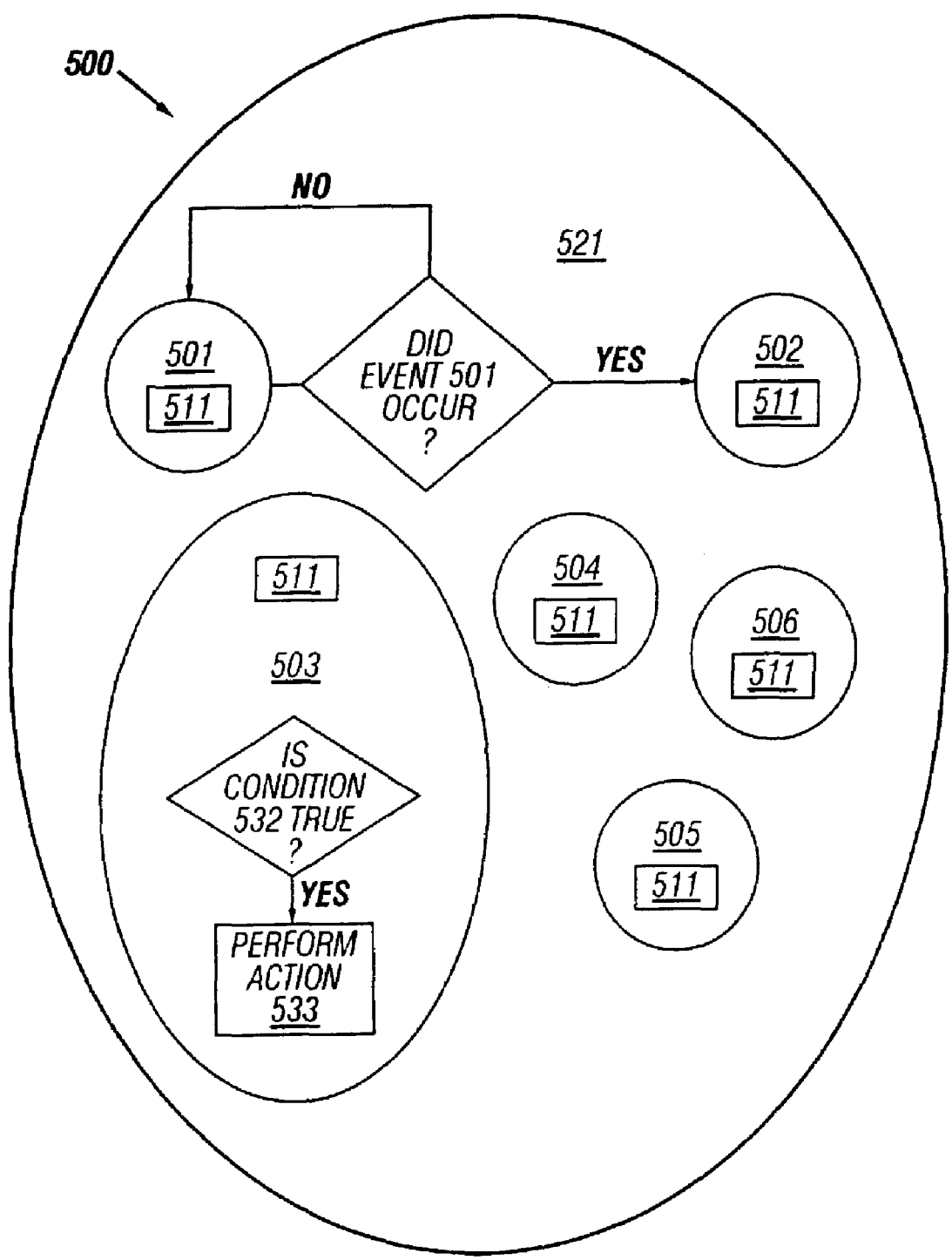
FIG. 5 illustrates how one embodiment of the invention handles state transitions.

FIG. 5 illustrates how one embodiment of the invention handles state transitions. This embodiment of the present invention provides a single metaphor for representing state transitions. This is accomplished by using an event model 500. The event model 500 is a set of events 501-506. Each event 501-506 in the event model 500 has an associated event type 511 and contains dependency logic that interrelates the events in the event model. An event in the event model can represent any kind of action it is defined to represent.

Each event model 500 contains one or more events 501-506. An event provides a way to manipulate data that is not dependent upon the structure of the data it is manipulating. Once an event is instantiated it is referred to as an event or an event instance. Each event 501-506 represents a set of actions that are optionally contingent upon a condition. The actions and conditions that comprise an event are determine when the event is created. Event 503, for example, has a condition 532 that causes an action 533 to occur. Each event may have a different set of actions and conditions. This enables an event to represent a number of different things. For example, an event can be created that represents the users in a database. An event could also represent the number of people who chose to visit a certain web page. An event can represent anything it is defined to represent. An event can depend on past events. In one embodiment of the invention when an event is created it is called an event instance. In one embodiment of the invention an event model $M_c$ is defined by defining an event, an event type, a dependency operator, and an event state. In this embodiment event model $M_c$ represents a model for cellular automaton. An event is defined as follows: let m,n$\in_\aleph$, and let E be a set of m*n events. This is written as $$E=\{e_{11},e_{12},\ldots,e_{1n},e_{21},\ldots,e_{2n},\ldots,e_{m1},\ldots,e_{mn}\}$$

Event E, for example, could represent a set of cells. Each event in the event model is associated with an abstract type called the event type 511. An event type 511 is a label supplied by the event model developer that supplies the external semantics for elements of an event metamodel. For example, in one embodiment of the invention all event types define all the event of E to be of the same event type. That is, for all x∈E, define $t_x=c$, where c is a constant event type. An event type 511, for example, represents an abstract object type. An abstract object type is itself a typed object. Thus, the set of abstract object types represented by this entity includes meta-types, meta-meta-types, meta-meta-meta-types, and meta-k-types where k is some natural number. In one embodiment of the invention an event type 511 is created to represent more than one event in the event model 511. If an event model creates three events that carry out similar tasks, one event type 511 can represent all three event. For example, if three events are created to send out electronic mail on different days these events can share the same event type 511. In FIG. 5 events 501-506 all share the same event type 511. In one embodiment of the present invention the data that is associated with an event type is called type datum.

In one embodiment of the present invention events can process data that is held in a database. For example, if a database containing user information is processed by an event called "subscription expired." The "subscription expired" event may have actions and conditions that define how it behaves. If the condition is satisfied the action is taken. For example, if the "subscription expired" event is processing the user database and it discovers a user whose subscription is expired the event will send that user a newsletter.

In one embodiment of the invention each event in an event model may depend on one or more other events. When this occurs an event dependency relationship 521 is created. An event dependency relationship is represented by the dependency operator. In one embodiment of the invention a bounding function b(x,u) is defined as:

$$b(x,u) = \begin{cases} 1 & \text{if } x<1 \\ u & \text{if } x<u \\ x & \text{otherwise} \end{cases}$$

The dependency operator Δ is the defined as:

$$\Delta(e_{ij}) = \bigcup_{k,l\in\{-1,1\}} \{e_{b(i+k,m),b(j+l,n)}\}$$

The function says that if E is written as an m * n array, then each event $e_{ij}$ depends upon all of its neighboring elements in the array. The above set of functions can be used to create a dependency relationship for an event model that emulates a simple cellular automaton.

An event dependency relationship 521 exists between an event called the dependent event and event called the prerequisite event. An event dependency relationship, for example, could be created to represent the fact that a subscription cannot expire unless a subscription first exists. To accomplish this a dependent and prerequisite event are created. Referring now to FIG. 5 for example, event 501 is a prerequisite event called "current subscribers" and event 502 is a dependent event called "subscription expired." In this example event 502 cannot occur unless event 501 first occurs. Therefore, events 501 and 502 are representative of the fact that a subscription cannot expire unless a person is first a subscriber.

Event Nodes

Figure 3:
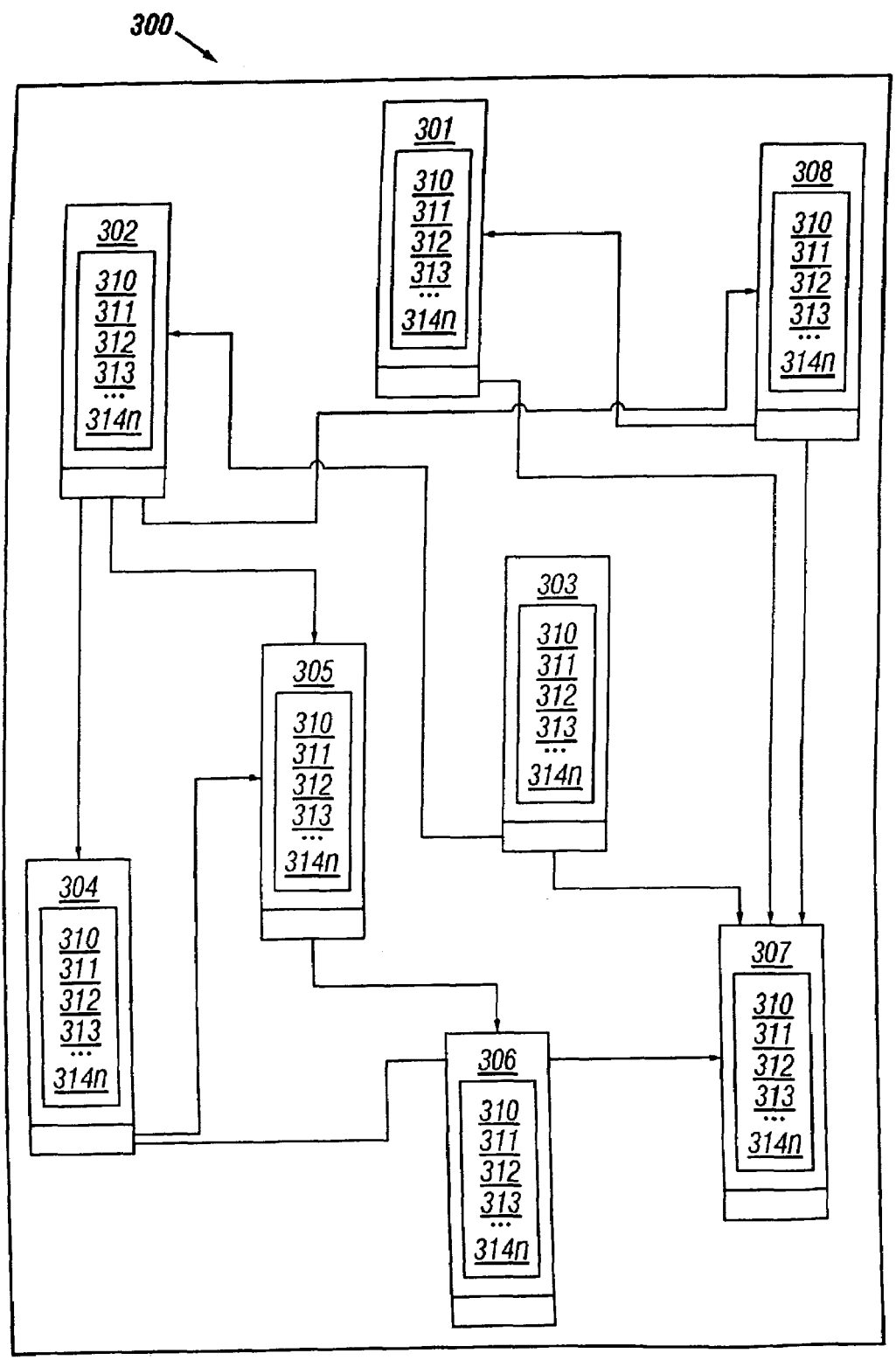
FIG. 3 illustrates how a set of events are grouped together in one embodiment of the invention.

In one embodiment of the invention each event is represented as an individual node. FIG. 3 illustrates how a set of events are grouped together. One way of representing one or more events is as nodes 301-308 in a directed graph 300. A directed graph 300, sometimes called a digraph, is a non-linear data structure. In a directed graph 300 each node 301-308 can have any number of links to any other node 301-308. For example, node 303 is linked to node 302, and node 307. This enables one event to depend on other events. The event nodes 301-308 contain a list of attributes 310-314n. The number of attributes 310-314n is determined by the person creating the event. There are a variety of different things an attribute can represent, for example, an attribute could represent an internal event state 310, data specific to a particular event 311, data shared by all events having the same event type 312, a way to decide when to try to generate a new internal state 313, and a way to generate a new internal state 314. More than one attribute can be created and an attributes can represent anything the programmer defines it to represent.

The events 301-308 illustrated in FIG. 3 each have an event state 310. An event state 310 is defined by the developer and varies according to the event that is created. For example, if a set of events relating to credit card authorization system is modeled, then the developer might choose to create the following event states: "authorization approved", "authorization declined", "hardware error—cannot retry", "line is busy—retry later." In one embodiment of the invention a set of possible event states S is defined as S={0,1}. The number of events neighboring e which are in state 1 is defined as $W(x)=|\{e\in\Delta(x):S_e=1\}|$. The state function is then defined as:

$$\varphi = \begin{cases} 1 & \text{if } W(e) > 2 \\ 0 & \text{otherwise} \end{cases}$$

The function φ says that an event is in state 1 if three or more of its neighboring events are in state1. When an event is in state 1 it is considered to be "alive". If an event is in state 0 it is considered to be "dead." Thus, function φ corresponds to the cell transition rules for John H. Conway's game of LIFE. Defining event states in this manner in combination with the dependency operator allows the developer to represent an event model $M_c$.

In one embodiment of the present invention each event also contains data or datum associated with it. The data or datum associated with an event is called event datum. Event datum is data that is specific to a single event instance. For example, if an event is created to send an electronic mail message to the winner of an online game the following data is associated with the event: a user identification number, the user's electronic mail address, the date the message is sent, and the text that comprises the message. Typically an event datum is not shared with another event, although in some instances it may be.

A type datum, on the other hand, is shared by more than one event. A type datum is associated with an abstract type and provides a way to compactly represent a set of events. This is accomplished by storing all the data shared by more than one event as type datums.

In one embodiment of the present invention an event can optionally have both a trigger function and a state function. A trigger function indicates whether an event has occurred or not. It does this by taking as input the set of events and their respective states upon which the event having the trigger function depends. If an event is "triggered" the trigger function returns a value of one. If the event is "not triggered" a value of zero is returned. The trigger function expresses the event model's dependency logic. That is it expresses the model's policy of when to continue processing events and when not to. The trigger function does this by implementing a stored procedure when the event is triggered. An event does not need to have a trigger function. A state function is utilized when an event is "triggered". An event's state function returns the event state. An event is not required to have a state function either.

Event Metamodel

In one embodiment of the present invention an event metamodel is created. An event metamodel is a model of one or more event models. Thus, it is a model of a model. An event metamodel can be instantiated to represent a number of different event models and the corresponding dependencies that interrelate them. The event metamodel is used, for example, to describe a set of modeled events. This is accomplished by maintaining values that represent the type of events the event metamodel describes. The event metamodel enables the model creator to control what happens to each and every event in the event metamodel without having to modify the underlying structure of the database. Instead of changing the structure of the database a new data type can be created in the event model. Once this new data type is created it can immediately be used. Thus, the event metamodel provides a way to add functionality to a database and immediately make that functionality available for use. All of this is done without having to create new tables or change the relationship that exists between tables.

Figure 6:
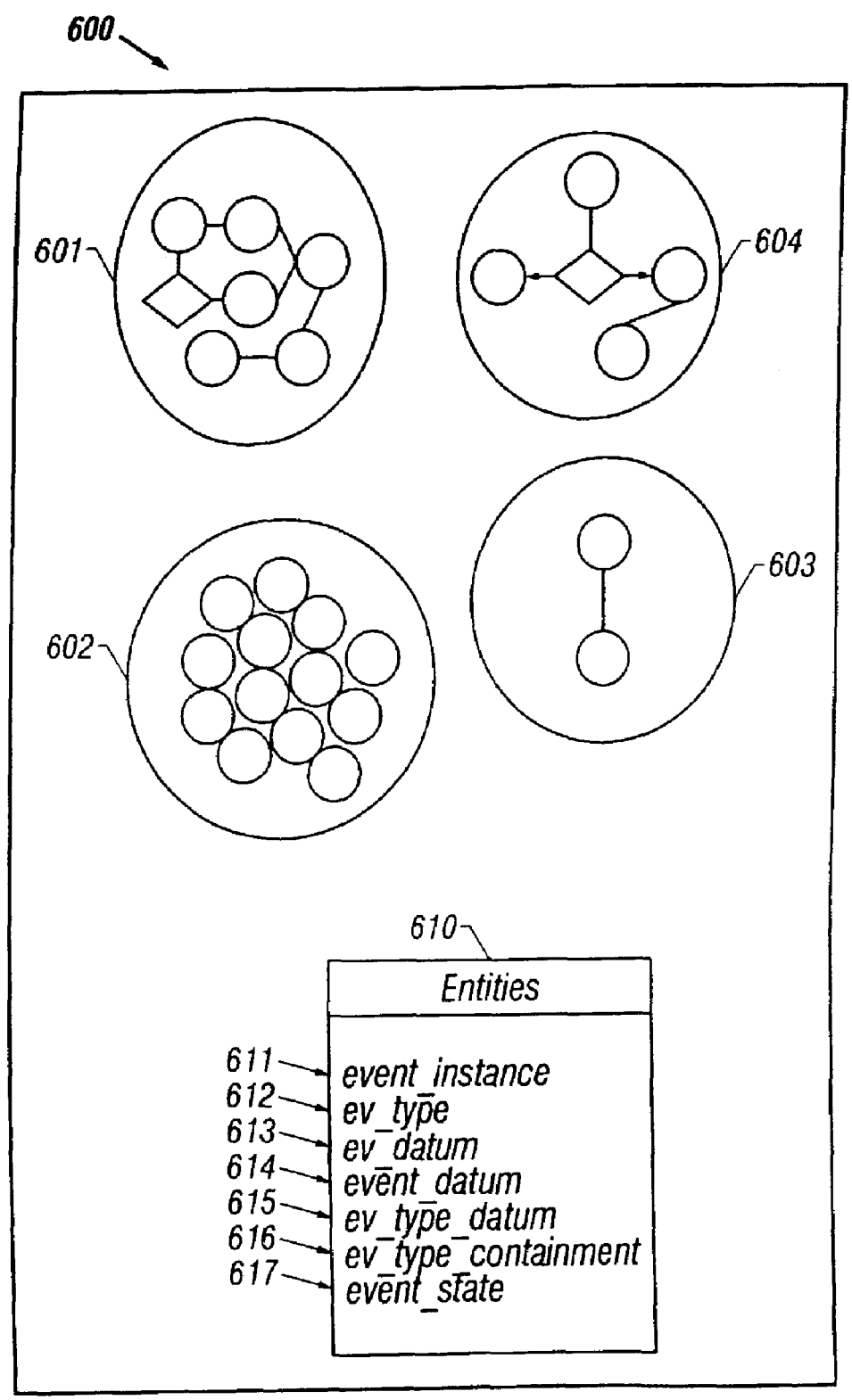
FIG. 6 illustrates how an event metamodel is organized in one embodiment of the invention.

FIG. 6 illustrates how an event metamodel 600 describes a set of modeled events 601-605. The event metamodel 600 provides a framework in which multiple event models 601-605 can be instantiated, and it contains a built-in clock mechanism that drives an instantiated event model 601-605, thus turning it into an event processor. More than one metamodel 600 can be created. Each event metamodel 600 contains a list of entities 610 that represent various attributes of the event metamodel 600.

In one embodiment of the invention the list of entities 610 contains the values event_instance 611, ev_type 612, ev_datum 613, event_datum 614, ev_type_datum 615, ev_type_containment 616, event_dependency 617, and event_state 618. Each value describes a different feature of the events the event metamodel represents. All the values that begin with ev_comprise the event metamodel, although other values may be added or subtracted at any time.

The event_instance 611 value represents the entire set of modeled events. The ev_type 612 value represents a set of all the abstract types each event contains. An abstract type is a label supplied by the model developer that supplies the external semantics for elements of the event metamodel. Each abstract type also has a type called the supertype, or super-1-type. Thus, the set of all abstract types contains abstract types, super-types, and super-super-types. The ev_datum 613 value represents a set of all the data each event is associated with. The event_datum 614 value represents an ordered set of all elements of event-specific data associated with an particular event. The ev_type_datum 615 value represents an ordered set of all the elements of type-specific data associated with an abstract type. The ev_type_containment 616 value represents a type containment relationship. The details of a type containment relationship are discussed below. The event_dependency 617 value represents the event dependency relationship of each event defines. For example, the event_dependency 617 value describes the set of events that another event depends on.

The event_state 618 value represents a set of all the possible event states each event within the event metamodel 600 has. The event metamodel may contain additional entities other than the ones illustrated in FIG. 6. For example, entities may be added that improve the performance and maintainability of the event metamodel 600.

Figure 4:
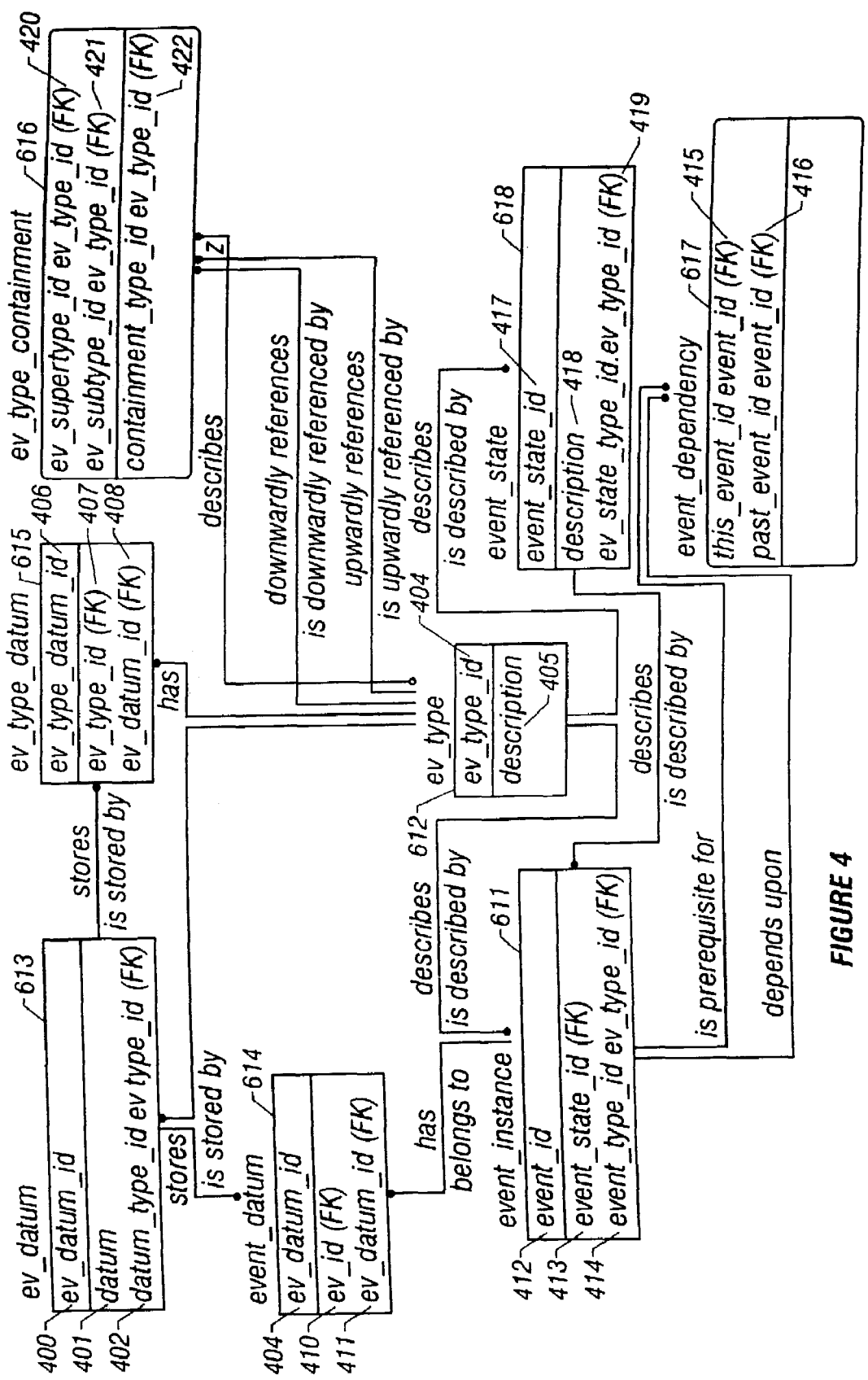
FIG. 4 illustrates how certain values are interrelated.

In one embodiment of the invention the values 611-618 that comprise the list of entities 610 is stored in a database. How each value 611-618 is interrelated is illustrated in FIG. 4. The values event_instance 611, ev_type 612, ev_datum 613, event_datum 614, ev_type_datum 615, ev_type_containment 616, event_dependency 617, and event_state 618 are shown.

The ev_type 612 describes one or more ev_datums 613. Thus, an ev_type 612 is the parent entity for ev_datum 613. An ev_type 612 comprises an ev_type_id 904 and a description 905. The ev_type 612 represents an abstract object type. An abstract object type is itself a typed object. Thus, the set of abstract object types represented by this entity includes meta-types, meta-meta-types, meta-meta-meta-types, and meta-k-types where k is some natural number. The ev_type_id 904 is used to uniquely identify each abstract type. In one embodiment of the invention the ev_type_id 904 functions as a primary key for the ev_type 612. The description 905 contains a name or description which uniquely identifies the ev_type. The event model internal code uses this attribute to uniquely identify object types. Description 905 is also made available to external applications for the same use.

In one embodiment of the invention ev_datum 613 is described by an ev_type 612. An ev_datum 613 stores one or more ev_type datum(s) 615. An ev_datum 613 comprises an ev_datum_id 900, datum 901, and an ev_type_id/datum_type_id 902. The ev_datum value 613 represents an abstract serializable typed data object whose string representation is no longer than the length of the data type "longest_varchar". An ev_datum 613 can be associated with event instances and with other abstract type objects. The ev_datum_id 900 held in ev_datum 611 is an attribute that uniquely identifies each stored datum. The ev_datum_id 900 is the primary key for ev_datum 613. The datum 901 is a serialized string representation of a data object. Each datum 901 is representative of one abstract type and its type identifier is contained in the attribute datum_type_id 902. The ev_type_id/datum_type_id 902 uniquely identifies each abstract type.

An ev_type 612 has one or more ev_type_datum(s) 615. Thus the parent entity to an ev_type_datum 615 is an ev_type 612. This makes ev_type_datum 615 a child entity. An ev_type_datum 615 is stored by ev_datum 613. Entity ev_type_datum 615 associates one or more datum(s) with an abstract type. This is useful when a group of events or types share common data. The ev_type_datum 615 contains an ev_type_datum_id 906, an ev_type_id (FK) 907, and an ev_datum_id (FK) 908. In one embodiment of the invention the ev_type_datum_id 906 functions as the primary key for ev_type_datum 615 by uniquely identifying each abstract type/datum relation. The ev_type_id (FK) 907 uniquely identifies each abstract type and the ev_datum_id (FK) 908 uniquely identifies each stored datum.

An ev_datum 613 stores one or more event_datum(s) 614. An event_datum 614 associates one or more datum(s) with an event instance. This is useful when an event needs to store data not shared with other events or abstract types. For example, if the administrator of a database wants to send a form-letter to user number 144332 at 10 PM tomorrow night to congratulate the user for winning an on-line computer game called fantasy baseball then the following event_datums 614 are associated with an event that sends the e-mail: userid=144332, fantasy team name, id-number of e-mail form-letter template. To represent this information each event_datum 614 comprises an event_datum_id 909, an event_id (FK) 910, and an event_datum_id (FK) 911. The event_datum_id 909 uniquely identifies each event-instance/datum relation and thus serves as the primary key for an event_datum 614. The event_id 910 uniquely identifies each event_instance and the event_datum_id (FK) 911 uniquely identifies each stored datum. Each event_datum 614 belongs to an event_instance 611.

An event_instance 611 has one or more event_datum(s) 614. An event_instance 611 represents an event E of some abstract type T, or event type. An event_instance 611 can depend upon past events, and it can be a past event of zero or more events. An event_instance 611 can also have an associated trigger function or a state function, or both. Neither a trigger function or a state function is necessary. Rather, both functions are optional.

The semantics of the word depend are supplied by the trigger function datum associated with abstract type T. An event trigger function is a stored procedure which takes as input the set of events upon which E depends and their respective states, and which returns a value of one or zero indicating whether the event E is triggered or not triggered. An event associated with a null trigger function datum is defined to be triggered. In one embodiment of the invention the state of an event is computed only if the event is triggered. The semantics of the word state are supplied by the state function datum associated with the abstract type, event_type_id, of E. An event state function is a stored procedure which computes an event_state and event_state_id based on the outcome of the actions it attempts to perform. An event type associated with a null state function datum is equivalent to an event type associated with no state function datum. The ordered set of actions which the state function attempts to perform supply the semantics of the event type T.

An event_instance 611 is comprised of a primary key and two foreign keys. The value event_id 912 is the primary key and the values event_state_id (FK) 913 and ev_type_id/event_type_id 914 are foreign keys. An event_id 912 uniquely identifies each event_instance 611. The event_state_id (FK) uniquely identifies each event state and the ev_type_id/event_type_id 914 uniquely identifies each abstract type.

Each event_instance 611 depends upon one or more event_dependency(s) 617. An event_instance 611 is also a prerequisite for each event_dependency 617. An event_dependency 617 represents the dependency relationship (DR) between an event E, called this event, and past events D1, D2, . . . , Dk where k is some natural number. Event E depends upon the past events. The semantics of the word depend are supplied by the trigger function associated with the abstract type of E. The event dependency relationship is a mesh. That is, an event can depend upon zero to many events. An event_dependency 617 is comprised of an event_id/this_event_id 915 and event_id/past_event_id 916. The event_id/this_event_id 915 and the event_id/past_event_id 916 both uniquely identify each event_instance 611.

Each event_instance 617 is also described by an event_state 618. An event_state 618 is comprised of an event_state_id 917, a description 918, and a ev_state_type_id.ev_type_id (FK) 919. The event_state 618 represents an abstract state of an event instance. The definition of event states is application-specific and varies according to the set of events being modeled. For example, is a set of events relating to credit card authorization is modeled then a useful set of states for these events might include the following: "Authorization approved", "Authorization declined", "Hardware error—cannot retry", "Line is busy—retry later." Trigger functions for the events which depend upon this event express the application policy of when to continue processing events dependent upon this event and when not to. The event_state_id 917 in event_state 618 uniquely identifies each event state. The description 918 contains a name which uniquely identifies this event state. The event model internal code uses description 918 to identify event states. Description 918 is also made available to external applications for the same use. The ev_state_type_id.ev_type_id (FK) 919 value uniquely identifies each abstract type.

In one embodiment of the present invention a hierarchical type containment relationship is created. A type containment relationship is a framework for organizing data associated with the event metamodel. The ev_type_containment 616 value represents the type containment relationship. An ev_type_containment 616 is comprised of an ev_supertype_id.ev_type_id (FK) 920, an ev_subtype_id.ev_type_id (FK) 921 and a containment_type_id.ev_type_id(FK) 922. The ev_supertype_id.ev_type_id (FK) 920, the ev_subtype_id.ev_type_id (FK) 921 and the containment_type_id.ev_type_id(FK) 922 are all used to uniquely identify each abstract type.

The ev_type_containment 616 value represents the hierarchical type inclusion relationship (HTIR) by associating some type (sometimes called a subtype) with a meta-(or super-) type. A hierarchical relationship (or ordering) was chosen over the more general mesh topology to simplify searches of the ordered set. The set of abstract object types can include meta-types, meta-meta-types, meta-meta-meta-types, and meta-(k)-types where k is some natural number. If a type is called which is not associated with a meta-type, then expressed in the notation above, this entity represents the set of relationships between meta-(k)-types and meta-(k+1)-types for all whole numbers k.

Because of the artificial restriction to hierarchical ordering, there can be more than one meaningful way to order a given set of abstract types in a type containment hierarchy. For this reason a new type called a type containment relationship is created called a containment type and associated with the ordering relation. The containment type enables a given set of abstract types to be ordered in any of a finite number of hierarchies. For example, a relation HA and a relation HB can both be represented by the containment type. All of the rows in the containment type corresponding to HA would have one value for containment_type_id. All of the rows corresponding to HB would have another, different value, for containment_type_id. The application locates in ev_type the type_id of the HTIR it wants to use, and then consider only those rows that have containment_type_ids that match the type_id.

Figure 7:
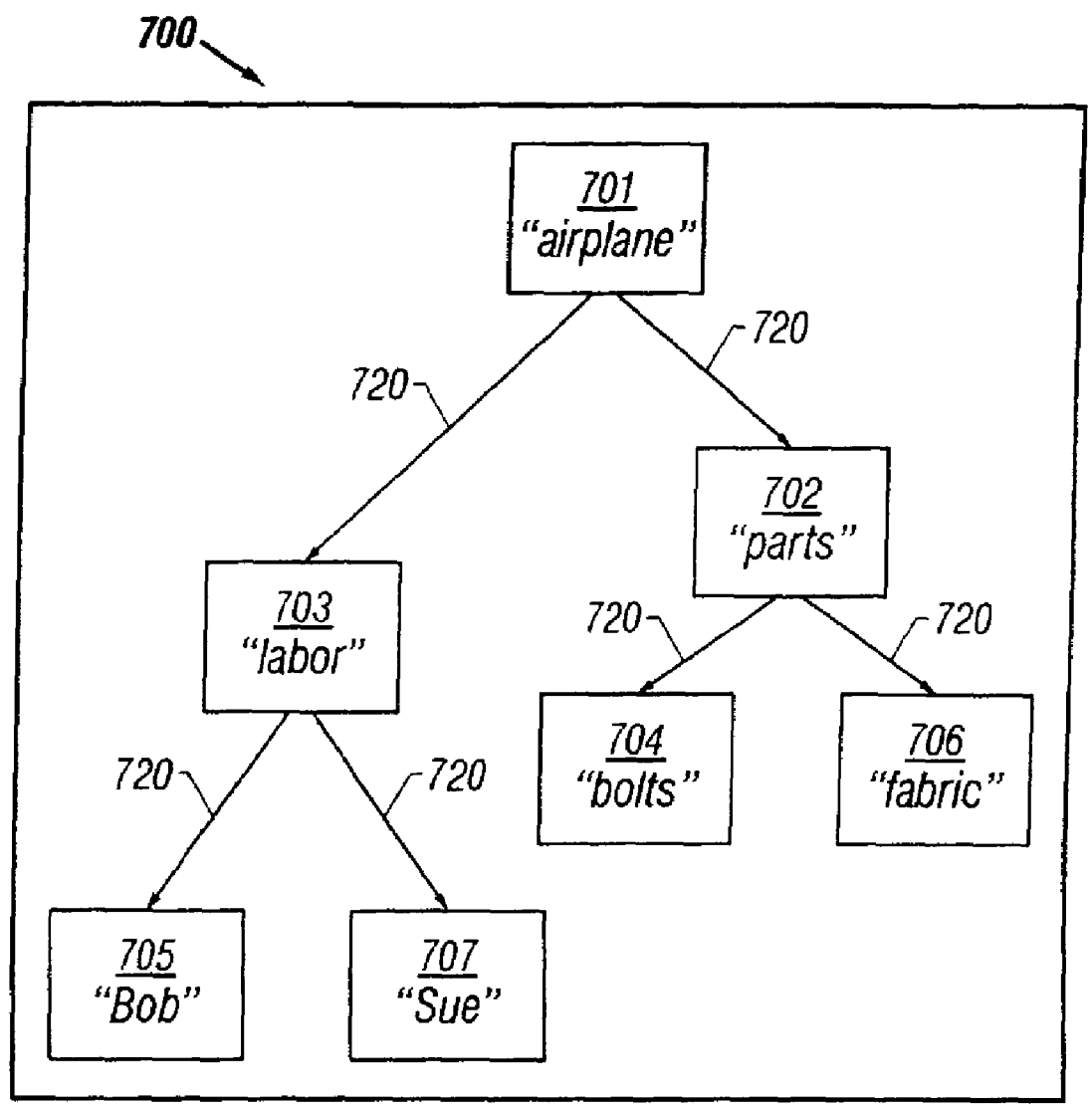
FIG. 7 illustrates a framework for organizing data associated with the event metamodel.

The data in a type containment relationship is organized into a hierarchical tree structure. The tree structure enables the developer to organize data so that the data can represent complex relationships. The type containment tree represents data that is related to, or a subtype of other data. Referring now to FIG. 7 for example, a tree 700 is shown. The tree contains a series of nodes. Each node in the tree 700 is called a type. Every type is connected to one or more other types by a branch. The branch represents the relationship one type has with another type and is therefore called a containment type.

The tree 700 represents a number of related types 701-707. Type 701 resides at the top of the tree 700. The remaining types 702-705 are subtypes of type 701. The tree 700 has two subtypes 702 and 703 branching from it. The subtypes 702 and 703 are connected by a containment type 720. Subtype 702 has two subtypes 704 and 706 branching from it these subtypes are connected to subtype 702 by another containment type. The subtypes 704 and 706 are related to subtype 702. Subtype 703 has two subtypes 705 and 707 branching from it and is connected to subtype 703 by another containment type 720. The subtypes 705 and 707 are related to subtype 703. The organization of types into tree 700 enables the developer to create a framework that is capable of representing complex relationships between different types.

If type 701, for example, represents an airplane then the subtypes 702-707 represent things related to an airplane. Subtypes 702 represents the parts of an airplane, for example, and subtype 703 represent the labor needed to maintain the airplane. The parts type, subtype 702, is further broken down into different kinds of parts. Subtype 704 and 706 represent those parts. Subtype 704 represents bolts and subtype 706 represents fabric. Bolts and fabric are both parts which an airplane contains. The labor type, subtype 703, is further broken down into the people that perform labor on the airplane. Subtype 705 and 707 represents those people. Subtype 705 represents Bob and subtype 707 represents Sue.

The tree 700 enables provides the developer with a way to represent and organize complex relationships between types 701-707. More than one meaning can be given to the same data. Therefore, additional trees can be made to represent additional relationships. For example, the people who perform the labor on the airplane discussed above can also work on cars, boats, or any other object the developer defines. The bolts the airplane contains can be used in other things as well.

Computerized Embodiment

Figure 1:
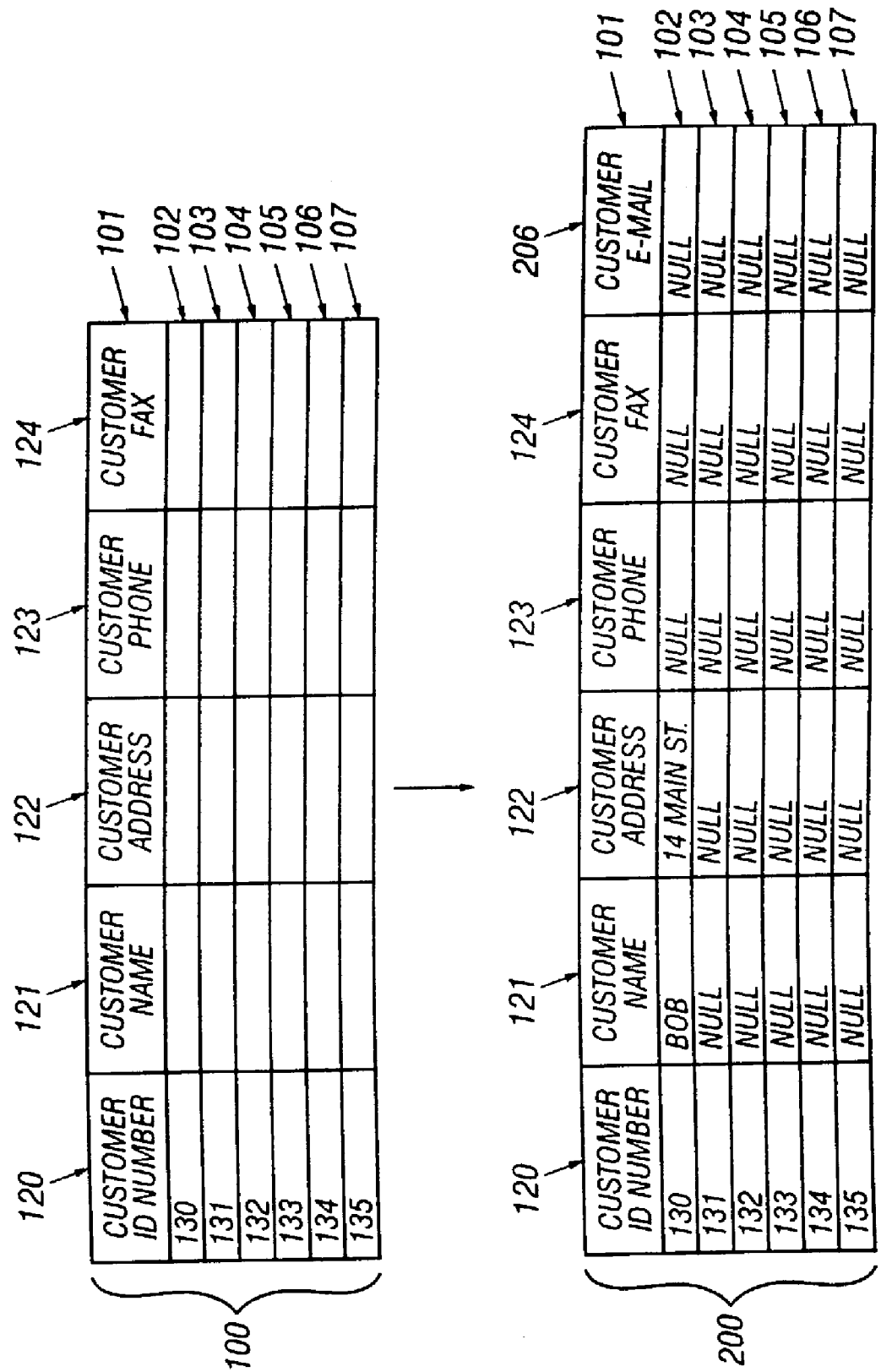
FIG. 1 illustrates a database table that contains customer information.
Figure 2:
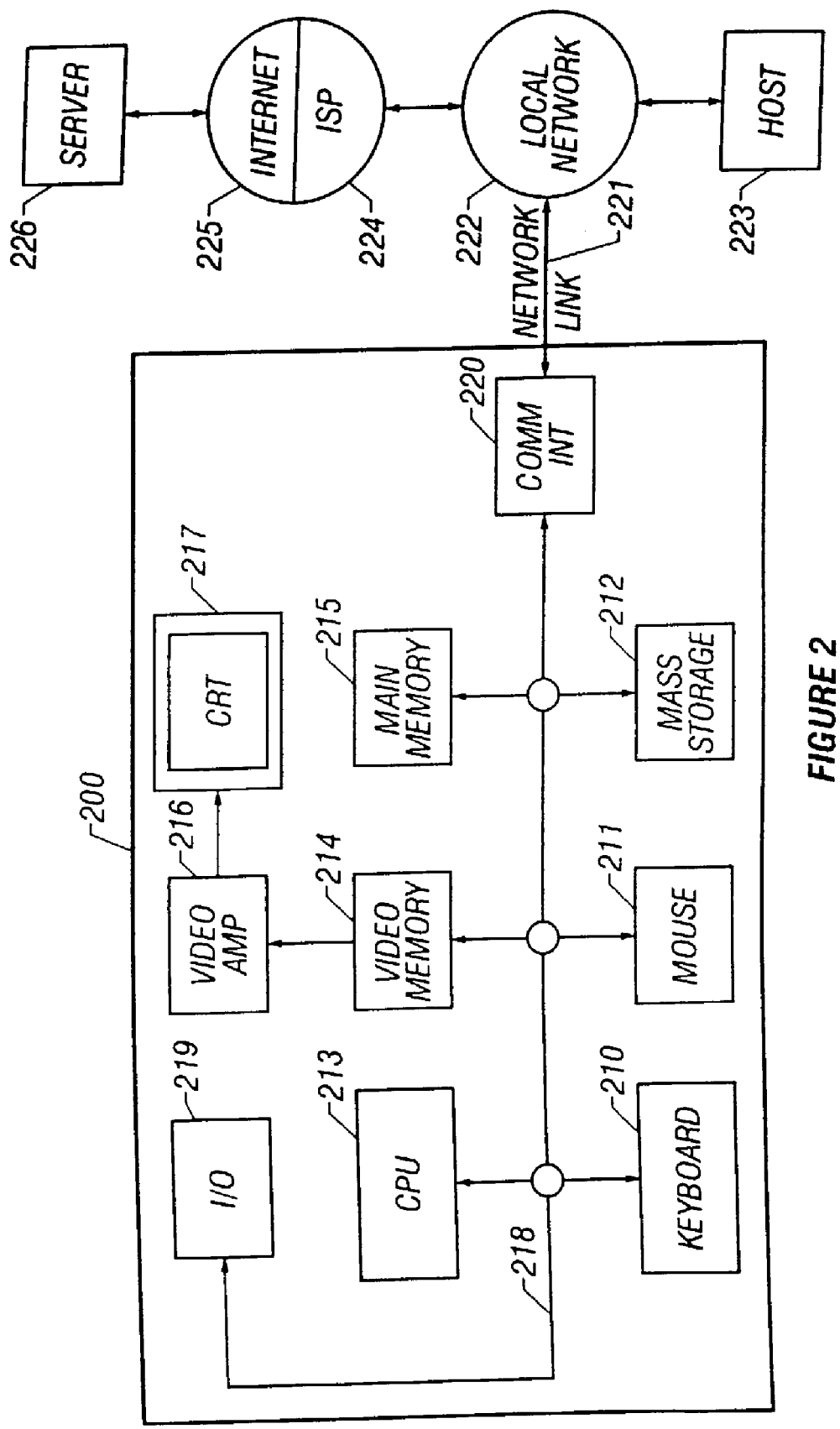
FIG. 2 illustrates an example of a computer system used to implement the present invention.

An embodiment of the invention can be implemented as computer software in the form of computer readable program code executed on a general purpose computer such as computer 200 illustrated in FIG. 2. A keyboard 210 and mouse 211 are coupled to a bidirectional system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured by Motorola, such as the 680X0 processor or a microprocessor manufactured by Intel, such as the 80X86, or Pentium processor, or a SPARC™ microprocessor from Sun Microsystems™. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220. In accord with the invention, one such downloaded application is the method and apparatus for event modeling described herein.

The received code may be executed by processor 213 as it is received, and/or stored in mass storage 212, or other non-volatile storage for later execution. In this manner, computer 200 may obtain application code by way of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer system described above is for purposes of example only. An embodiment of the invention may be implemented in any type of computer system or programming or processing environment including, but not limited to, an embedded system.

Thus, a method and apparatus for method and apparatus for event modeling has been described.

Appendix A 4.3 Published API 4.3.1 ev_AddDateSingletonEvent

Create a new event instance of type DATE SINGLETON EVENT. A date singleton event is the special ca of an interval singleton event with an interval of 1 day.

4.3.2 ev_AddEventDatum

Create a new datum and associate it with an event instance.

4.3.3 ev_AddEventDependency

Create a dependency relationship between two event instances. "This event" will depend on the "past event". Or put another way, "past event" is prerequisite to and is generally evaluated before "this event".

4.3.4 ev_AddEventInstanceByTypeDesc

Create a new event instance of the type specified by ©event_type_desc.

4.3.5 ev_AddIntervalSingletonEvent

Create a new interval singleton event, or ISF. An ISF is an active event exactly one of which occurs within the given chronological interval. If ©event_type_desc. is specified, an event of that type is created; otherwise a generic ISE is created. Upon return ©new_event_id will continue the event_id of the ISE which already existed, or which was newly-created ISE if no existing ISE was found.

4.3.6 ev_AddTestEvents

Populate the schema with some test events.

4.3.7 ev_AddTypeDatum

Create a new datum and associate it with the specified type.

Type level data are used to store data elements which are shared by all instances of a given type.

For example, a type called 'Bob's email events' might all use the same mail server. So disk space is conserved by storing this datum at the type level rather than at the event_instance level. A good Java analogue would be static class variables.

4.3.8 ev_DeleteEventInstance

Delete an event instance. Rows in table event_datum corresponding to this event_id are cascade-deleted by a delete trigger on table event_instance.

4.4 Internal functions 4.4.1 ev_add_datum

Add a new datum and associate it with a table specified in part by one of the arguments.

4.4.2 ev_add_event_instance

Add a new event instance.

4.4.3 ev_clock_tick

This is the core of the event processing subsystem. It should be run periodically.

4.4.4 ev_event_compute_state

Compute and return the state of a single event. This procedure is meant to be called only by the procedure ev_update_event_states.

4.4.5 ev_get_evtypeid_by_desc

Translate a type description into a type id.

4.4.6 ev_get_state_id_by_desc

Translate a state description into a states id.

4.4.7 ev_get_type_datum

Retrieve a datum directly associated with or inherited by an abstract type. Inheritance is computed relative to the given containment type.

4.4.8 ev_init_metamodel

Initialize the event model and metamodel data structures.

4.4.9 ev_log

Handle a log message generated by the event processor. The more positive the message level, the more toward "noise" you get. The more negative the message level, the more "urgent" you get. A null ©squelch_threshold means no squelching.

The variables ©indentwidth and ©©nestlevel are both used to compute an indentation offset for the descriptive part of the log message. Set ©indentwidth=0 to turn off indenting.

The argument ©indentleveldelta lets the caller adjust indentation by (additive) fractions of ©indentwidth.

Note that for large event meshes, performance may require the use of a less computationally intensive logging function.

4.4.10 ev_sf_date_passed

This event state function will indicate whether a specified date has passed. It takes a single argument, which it expects to be convertable to the datetime MS SQL datatype.

4.4.12 ev_tf_all_complete

This event trigger function indicates whether all prerequisite events to ©dep_event_id have happened, viz. their state type id's are that of the state type HAPPENED.

Note that the cursor called nextprereq retrieves the set of events upon which ©dep_event_id is dependent.

4.4.13 ev_tf_date_passed

This event trigger function will indicate whether a specified date has passed. It takes a single argument, which it expects to be convertable to the datetime MS SQL datatype.

4.4.14 ev_update_event_states

Compute and update the state of events matching certain criteria which are incorporated into a view, the name of which view is passed-in as ©eventset_name.

5. Example model: TheStreet free trial email

5.1 Goal

As a user's free trial subscription to TheStreet.com nears expiration, send mail to encourage the user to purchase a subscription. Send email on the seventh, thirteenth and sixteenth days after the start of the free trial subscription.

5.2 Event model

5.2.1 Types

We define one event type t=THE STREET FREE TRIAL EMAIL, which is a subtype of type EVENT TYPE.

5.2.2 Events

A set of three events E $\{e_1, e_2, e_3\}$ is defined the elements of which correspond respectively to the first, second and third emails to the user. All three events are of type t.

5.2.3 Event datums

Three datums are defined which are associated with each element of E: $ed_1$ which stores the userid of the user, $ed_2$ which stores the date after which the email should be sent, and $ed_3$ which stores which of the three email form letters to send.

5.2.4 Event states

Each event of type t will exist in one of two states: $s_1$=HAPPENED and $s_2$=YET TO HAPPEN. Upon creation an event is initialized to state $s_1$ and the event transitions to state $s_2$ only when it succeeds in sending its email message.

The state function $\varphi t$ is defined as $$\varphi_t = \begin{cases} s_1 & \text{if mail success fully sent} \\ s_2 & \text{otherwise} \end{cases}.$$

5.2.5 Dependency operator

For i i $\in$ $\{1,2,3\}$ the dependency operator is defined as $$\Delta(e_i) = \begin{cases} 0 & \text{if } i = 1 \\ e_{i-1} & \text{if } i > 1 \end{cases},$$

which expresses the requirement that an email event for a given user depend on the previous email event for that user, if one exists.

The trigger function $T_t$ is defined as $$T_t(e) = \begin{cases} 1 & \text{if today } > d_2 \text{ and } \forall x \in \Delta(e), \varphi t(x) = s_1 \\ 0 & \text{otherwise} \end{cases}.$$

The function $T_t$ expresses the requirement that the current event will execute, or compute its own state, only if (1) today's date is later than the desired email send date and (2) all events prerequisite to this one have "HAPPENED".

5.3 Implementation

5.3.1 Stored procedures

AddEmailByTypeDescDate Adds a "TheStreet" email event of the specified type for the specified date. A bridge date singleton event precedes the email event to reduce computation when many emails happen on a given date. Computation is simplified because until the date singleton event happens, only the date singleton is checked for computability yielding savings which are superlinear in the number of email events scheduled per day.

AddStreetEmailEventsForUser Creates a set of events which will send a sequence of emails to a "TheStreet free-trial" owner prior to the expiration of the free trial.

SendStreetEmailToUser Implements $\varphi t$ for "TheStreet" email events. This procedure retrieves an email form letter corresponding to $ed_3$, addresses it to the email address of userid $ed_1$ and submits the addressed letter to the commerce system's outgoing mail queue.

The invention claimed is:

1. A method for changing a state associated with a database record, comprising:
   defining an event metamodel that includes an event model, wherein the event model includes a plurality of events, and wherein the plurality of events includes dependency logic that interrelates the plurality of events;
   defining an event type associated with one event of the plurality of events, wherein the event type includes a label that supplies a relationship between the event and the event metamodel; and
   changing the state associated with the database record by using the event metamodel, wherein the database record represents a customer of a subscription service, and wherein the state associated with the database record represents a status of a periodic subscription of the customer.

2. The method of claim 1, wherein the event metamodel further includes a second event model.

3. The method of claim 1, wherein instantiating the event metamodel results in the event model.

4. The method of claim 1, further comprising defining an event processor that comprises a clock and the event model.

5. The method of claim 4, wherein using the event metamodel comprises executing the event processor at each clock cycle.

6. The method of claim 5, wherein executing the event processor comprises processing zero or more events of the plurality of events.

7. The method of claim 6, further comprising changing the state associated with the database record in response to the processed events.

8. The method of claim 1, wherein the event includes an action.

9. The method of claim 8, wherein using the event metamodel comprises executing the action.

10. The method of claim 8, wherein using the event metamodel comprises executing, if the event is triggered, the action.

11. The method of claim 8, wherein the action is contingent upon a condition.

12. The method of claim 11, wherein using the event metamodel comprises executing, if the condition is satisfied, the action.

13. The method of claim 8, wherein the action determines whether the event is triggered.

14. The method of claim 1, wherein the event includes a state.

15. The method of claim 14, wherein the event further includes a trigger function that determines whether to change the state of the event.

16. The method of claim 14, wherein the event further includes a state function that determines how to change the state of the event.

17. A method for changing a state associated with a database record, comprising:
defining an event metamodel that includes an event model, wherein the event model includes a plurality of events, and wherein the plurality of events includes dependency logic that interrelates the plurality of events;
defining an event type associated with one event of the plurality of events, wherein the event type supplies a relationship between the event and the event metamodel; and
changing the state associated with the database record by using the event metamodel, wherein the database record represents a customer of a subscription service, and wherein the state associated with the database record represents a status of a periodic subscription of the customer.

18. A method for changing a state associated with a database record, comprising:
defining an event model that includes a plurality of events, wherein the plurality of events includes dependency logic that interrelates the plurality of events;
defining an event type associated with one event of the plurality of events; and
changing the state associated with the database record by using the event model, wherein the database record represents a customer of a subscription service, and wherein the state associated with the database record represents a status of a periodic subscription of the customer.

19. A method for changing a state associated with a database record, comprising:
defining an event metamodel that includes an event model, wherein the event model includes a plurality of events, and wherein the plurality of events includes dependency logic that interrelates the plurality of events;
defining an event type associated with one event of the plurality of events, wherein the event type includes a label that supplies a relationship between the event and the event metamodel; and
changing the state associated with the database record by using the event metamodel, wherein the database record represents a customer of a subscription service for a product, and wherein the state associated with the database record represents a status of a periodic subscription of the customer.

20. The method of claim 19, wherein the product comprises a newsletter.

21. The method of claim 19, wherein the product comprises a magazine.

22. The method of claim 19, wherein the status of the periodic subscription of the customer comprises one element of a group consisting of:
new;
about to expire;
targeted for a renewal offer; and
newly renewed but not yet paid.

23. A method for changing a state associated with a database record, comprising:
defining an event metamodel that includes an event model, wherein the event model includes a plurality of events, and wherein the plurality of events includes dependency logic that interrelates the plurality of events;
defining an event type associated with one event of the plurality of events, wherein the event type includes a label that supplies a relationship between the event and the event metamodel; and
changing the state associated with the database record by using the event metamodel, wherein the database record represents a customer of a subscription service, and wherein the state associated with the database record represents a status of a periodic subscription of the customer, a subscription fee being charged for the periodic subscription.

\* \* \* \* \*